(No Model.)
N. TESLA.
APPARATUS FOR PRODUCING CURRENTS OF HIGH FREQUENCY.
No. 583,953.  Patented June 8, 1897.
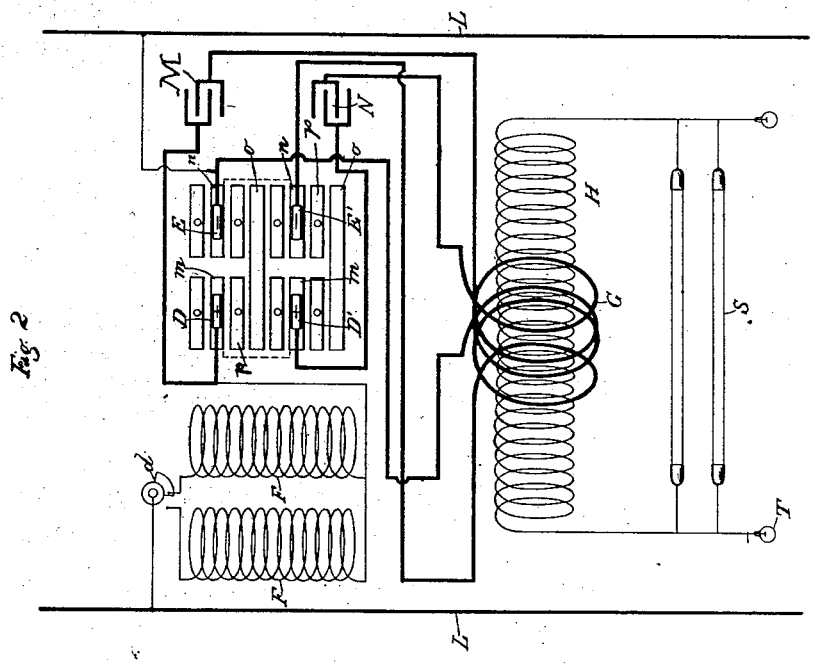
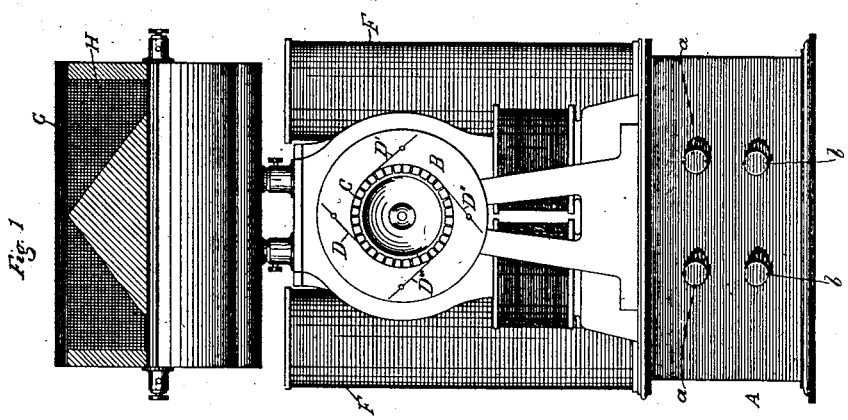
WITNESSES
G. B. Lewis.
Edwin B. Hopkinson.
INVENTOR
Nikola Tesla
BY
Kerr, Curtis & Page
ATTORNEYS.

UNITED STATES PATENT OFFICE.

NIKOLA TESLA, OF NEW YORK, N. Y.

APPARATUS FOR PRODUCING CURRENTS OF HIGH FREQUENCY.

SPECIFICATION forming part of Letters Patent No. 583,953, dated June 8, 1897.

Application filed October 19, 1896. Serial No. 609,292. (No model.)

*To all whom it may concern:*

Be it known that I, NIKOLA TESLA, a citizen of the United States, residing at New York, in the county and State of New York, have invented certain new and useful Improvements in Apparatus for Producing Currents of High Frequency, of which the following is a specification, reference being had to the drawings accompanying and forming a part of the same.

The invention upon which my present application is based is an improvement in apparatus for the conversion of electrical currents of ordinary character—such, for instance, as are obtainable from the mains of municipal electric light and power systems and either continuous or alternating—into currents of very high frequency and potential.

The improvement is applicable generally to apparatus of the kind heretofore invented by me and more particularly described in United States Letters Patent granted to me on September 22, 1896, No. 568,176; but in the description of the invention which follows the illustration is confined to a form of apparatus designed for converting a continuous or direct current into one of high frequency. In the several forms of apparatus for this purpose which I have devised and heretofore described I have employed a circuit of high self-induction connected with the mains from a suitable source of current and containing some form of circuit-controller for periodically interrupting it. Around the break or point of interruption I have arranged a condenser, into which the circuit discharges when interrupted, and this condenser is in turn made to discharge through a circuit containing the primary of a transformer, and of such character that the condenser-discharge will be in the form of an extremely rapid succession of impulses.

Now in order to secure in an apparatus of this kind as high frequency as possible and the advantages resulting therefrom I subdivide the condenser necessary for storing the energy required into integral parts or provide independent condensers, and employ means for charging said condensers in multiple and discharging them in series through the primary of the transformer. To secure this result without unduly complicating the apparatus is a matter of very considerable difficulty, but I have accomplished it by means of the apparatus which I shall now proceed to describe by reference to the drawings.

Figure 1 is a side elevation of the apparatus which I employ, and Fig. 2 is a diagram of the circuit connections.

Referring to Fig. 1, A is a box or case containing the condensers, of which the terminals are $a\ a\ b\ b$, respectively. On this case is mounted a small electromagnetic motor B, by the shaft of which is operated the circuit-controller C. Upon the said controller bear brushes, as shown at D D′ D″ D‴.

F F are self-induction coils placed beside the motor. Above these is the transformer, composed, essentially, of a primary G and a secondary H. These devices are intended to be inclosed in a suitable box or case, and may be very greatly modified in construction and relative arrangement. The circuit-controller, however, should conform in general principle of construction to that hereinafter described in so far as may be necessary to secure the operation pointed out.

Referring now to Fig. 2, L L designate the mains from a suitable source of supply, between which a circuit is formed, including the self-induction coils F F and the circuit-controller C. A switch $d$ may be employed to bring either or both of the coils F F into this circuit, as may be desired.

The circuit-controller is built up of insulated plates or segments, upon which the positive and negative brushes bear, and these plates may be considered as belonging to three sets or classes, first, the plates $m$ for what may be considered as the positive brushes D D′ in one row, electrically connected together, and the corresponding plates $n$ for what may similarly be considered as the negative brushes E E′ in the other row; second, the plates $o$, which lie in both rows, and hence are conveniently made in single pieces extending across the controller, and, third, the idle or spacing plates $p$, which are interposed in each row between the other two sets. The angle between adjacent plates of the same set is equal to the angle of displacement between adjacent brushes of the same sign, and obviously there may be two or more of each. The brush D of one set is connected with one main through the coils F, and each one of the brushes of the same set is connected to one of the terminals of the condensers M N, respectively. Similarly the brush E of the other set of brushes is connected to the opposite main and each of the brushes of said set to the opposite condenser terminals through the primary or strands of a primary G. In the diagram, Fig. 2, I have shown but two brushes in each set and two condensers, but more than this number may be used, the same plan of connections shown and described being followed out.

In the position of the parts shown in Fig. 2, in which two positive and two negative brushes are shown, the brushes are bearing on plates m m and n n. Consequently the circuit through the coils F F is through the condensers in multiple, and, assuming that energy has been stored in said coils, the condensers will thus be charged. If now by the movement of the controller plates or brushes the latter are shifted across the idle or spacing plates p onto the long or cross-connected plates o two results follow: The mains are short-circuited through the coils F F, which therefore store energy, while the condensers are connected in series through the primary coil or coils G. These actions are repeated by the further movement of the controller, the condensers being charged in parallel when the brushes are on plates m n and discharged in series when the brushes pass onto plates o. The motor may be run by an independent source or by current derived from the mains, and the apparatus may be employed to supply current for any suitable devices S T, connected with the secondary coil H.

As stated above, the specific construction of the circuit-controller may be very greatly varied without departure from the invention. In the drawings the plates are assumed to be associated in the form of a cylinder which revolves with respect to brushes bearing on its periphery; but it will be understood that this is merely a typical illustration of any form of terminals or contacts and conductors, whether rotary or reciprocating, which constitute a circuit-controller capable of effecting the same result.

The advantages resulting from the subdivision of the condenser or the employment of a plurality of condensers are mainly that a high frequency is obtainable in apparatus of any size; that the current of discharge through the sliding contacts is greatly reduced and injury to such contacts thereby avoided and a great saving in wire in the secondary effected.

What I claim is—

1. In an apparatus of the kind described, the combination with a set of contacts, one of which is adapted for connection with one of the mains from a source of current, and each of which is connected to one of the terminals of a series of condensers, and a second set of contacts similarly connected to the opposite main and condenser terminals, respectively, of electrically-connected plates or segments upon which the contacts of the first set bear, similarly-connected plates upon which the contacts of the second set bear, and isolated plates common to the two sets of contacts, the said plates being arranged in the manner described, whereby the condensers will be alternately charged in multiple and discharged in series, as set forth.

2. In an apparatus of the kind described, the combination with a set of positive brushes, one of which is adapted for connection with one of the mains from a source of current, and each of which is connected to one of the terminals of a series of condensers, and negative brushes similarly connected to the opposite main and condenser terminals, respectively, of a cylinder composed of electrically-connected segments upon which the positive brushes only bear, similarly-connected segments upon which the negative brushes only bear, and isolated plates upon which both sets of brushes simultaneously bear, the said plates being arranged in the manner described, whereby the condensers will be alternately charged in multiple and discharged in series, as set forth.

NIKOLA TESLA.

Witnesses:
M. LAWSON DYER,
DRURY W. COOPER.